(12) United States Patent
Joshi et al.

(10) Patent No.: US 8,417,559 B2
(45) Date of Patent: Apr. 9, 2013

(54) ASSORTMENT PLANNING BASED ON DEMAND TRANSFER BETWEEN PRODUCTS

(75) Inventors: Ashutosh Umakant Joshi, Sunnyvale, CA (US); Zhenyu Yan, El Cerrito, CA (US); Marc-david Cohen, Ross, CA (US); Shailesh Kumar, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1120 days.

(21) Appl. No.: 12/110,171

(22) Filed: Apr. 25, 2008

(65) Prior Publication Data

US 2009/0271245 A1  Oct. 29, 2009

(51) Int. Cl.
  *G06Q 30/00* (2012.01)
(52) U.S. Cl.
  USPC ........................................ 705/7.31; 705/7.29
(58) Field of Classification Search ............... 705/10, 705/7.29, 7.31
  See application file for complete search history.

(56) References Cited

U.S. PATENT DOCUMENTS

| 6,366,890 | B1 * | 4/2002 | Usrey ........................ 705/7.31 |
| 2005/0197849 | A1 * | 9/2005 | Fotteler et al. ............... 705/1 |
| 2005/0197872 | A1 * | 9/2005 | Fotteler et al. ............... 705/7 |
| 2005/0246482 | A1 * | 11/2005 | Gabelmann et al. ........ 711/111 |
| 2007/0094066 | A1 | 4/2007 | Kumar et al. |
| 2007/0094067 | A1 | 4/2007 | Kumar et al. |
| 2007/0100680 | A1 | 5/2007 | Kumar et al. |
| 2007/0118439 | A1 | 5/2007 | Kumar et al. |
| 2009/0271245 | A1 * | 10/2009 | Joshi et al. ................... 705/10 |

OTHER PUBLICATIONS

Chapter 6 Assortment Planning: Review of Lliterature and Industry Practice—by Kok et al. Apr. 2006, revised Nov. 2006.*
Demand Estimation and Assortment Optimization Under Substitution: Methodology and Application—by Kok and Fisher Operations Research vol. 55 No. 6 Nov.-Dec. 2007, pp. 1001-1021 2007 INFORMS.*
Chapter6 Assortment Planning: Review of Literature and Industry Practive by Kok et al. Apr. 2006, revised Nov. 2006.*
7th online—[http://www.thefreelibrary.com/Retailers+Rank+7thOnline+as+Top+Software+Provider+in+Apparel+Magazine . . . -a0145 924325].
Automated Micro Assortment Planner from Galleria Retail Technology Solution Ltd. [http://www.retailsolutionsonline.com/doc.mvc/Advanced-Retail-Planning-Galleria-Launches-Ve-0001].
Oracle Retail Category Management from Oracle—[http://docs.oracle.com/cd/B31324_01/catman/pdf/12123/catman-12123-ug.pdf].

(Continued)

*Primary Examiner* — Andre Boyce
*Assistant Examiner* — Ernest A Jackson
(74) *Attorney, Agent, or Firm* — Mintz, Levin, Cohn, Ferris, Glovsky and Popeo, P.C.

(57) ABSTRACT

A computer-implemented method described for facilitating selection of an assortment of products to offer for sale. The method includes receiving transaction data representing characteristics of a plurality of commercial transactions including a first product and a second product. Product attribute data representing attributes for at least the two products are also received. Substitution demand data for the second product is estimated which represents demand for the second product given the first product is not available, the estimation being based on the transaction data and product attribute data.

34 Claims, 14 Drawing Sheets

OTHER PUBLICATIONS

SAP Retail Merchandise and Assortment Planning from SAP—[http://www.sap.com/spain/industries/retail/pdf/SAP_Merchandise_and_Assortment_Planning.pdf].

Smith, S.A., N. Agrawal, "Management of multi-item retail inventory systems with demand substitution," Operations Research, 48 p. 50-64 (2000).

Torex Compass-SCM—[http://pinpoint.microsoft.com/en-gb/applications/torex-compass-scm-4294992363].

van Ryzin, G., S. Mahajan, "On the relationship between inventory costs and variety benefits in retail assortments," Management Science, 45, p. 1496-1509, (1999).

\* cited by examiner

Assortment: 310

| Products | Selected | Direct Profit | Transferred Profit | Integrated Profit | Inventory Cost |
|---|---|---|---|---|---|
| Product 1 | ☑ | 5 | 4.272267046 | 9.272267046 | 450 |
| Product 2 | ☐ | 0 | 0 | 0 | 0 |
| Product 3 | ☑ | 5 | 4.737383325 | 9.737383325 | 450 |
| Product 4 | ☐ | 0 | 0 | 0 | 0 |
| Product 5 | ☐ | 0 | 0 | 0 | 0 |
| Product 6 | ☐ | 0 | 0 | 0 | 0 |
| Product 7 | ☑ | 5 | 5.936768832 | 10.93676883 | 450 |
| Product 8 | ☑ | 5 | 0.408080001 | 5.408080001 | 450 |

312  314  316  318  320

Total Net Profit = 5270.9    322

[Optimize it!]    324

Fig. 3

Parameters:

| Initial likelihood of Leave without purchase | 0.2 |
|---|---|
| Exp No. of custom in a given period | 200 |

{ 426

| | Unnormalized Original Demands | Normalized Original Demands | Price per unit | Cost per unit | Inventory cost | Distance to leave without purchase if this product is not available | |
|---|---|---|---|---|---|---|---|
| Product 1 | 0.125 | 0.1 | 100 | 50 | 450 | 9 | ∨∧ |
| Product 2 | 0.125 | 0.1 | 100 | 50 | 450 | 9 | ∨∧ |
| Product 3 | 0.125 | 0.1 | 100 | 50 | 450 | 9 | ∨∧ |
| Product 4 | 0.125 | 0.1 | 100 | 50 | 450 | 9 | ∨∧ |
| Product 5 | 0.125 | 0.1 | 100 | 50 | 450 | 9 | ∨∧ |
| Product 6 | 0.125 | 0.1 | 100 | 50 | 450 | 9 | ∨∧ |
| Product 7 | 0.125 | 0.1 | 100 | 50 | 450 | 9 | ∨∧ |
| Product 8 | 0.125 | 0.1 | 100 | 50 | 450 | 9 | ∨∧ |

| Entity Type = Laptop Computers |||
|---|---|---|
| Laptop $X_1$ | Laptop $X_2$ | Laptop $X_3$ |
| $x_{11}=Sony$<br>$x_{12}=17"\ screen$<br>$x_{13}=Centrino$<br>$x_{14}=250GHDD$ | $x_{21}=Apple$<br>$x_{22}=15"\ screen$<br>$x_{23}=DualCore$<br>$x_{24}=250GHDD$ | $x_{31}=Dell$<br>$x_{32}=15"\ screen$<br>$x_{33}=Centrino$<br>$x_{34}=200GHDD$ |

Fig. 5a

| Value | Feature(s) |
|---|---|
| Sony | $x_{11}$ |
| 17"Scr | $x_{12}$ |
| Centrino | $x_{13}, x_{33}$ |
| 250GHDD | $x_{14}, x_{24}$ |
| Apple | $x_{21}$ |
| 15"Scr | $x_{22}, x_{32}$ |
| DualCore | $x_{23}$ |
| Dell | $x_{31}$ |
| 200GHDD | $x_{34}$ |

Fig. 5b

| | Sony | 17"Scr | Centrino | 250GHDD | Apple | 15"Scr | DualCore | Dell | 200GHDD |
|---|---|---|---|---|---|---|---|---|---|
| Sony | | 3 | 3 | 3 | | | | | |
| 17"Scr | 3 | | 3 | 3 | | | | | |
| Centrino | 3 | 3 | | 3 | | 5 | | 5 | 5 |
| 250GHDD | 3 | 3 | 3 | | 4 | 4 | 4 | | |
| Apple | | | | 4 | | 4 | 4 | | |
| 15"Scr | | 5 | 4 | 4 | | | 4 | 5 | |
| DualCore | | | 4 | 4 | 4 | | | | |
| Dell | | 5 | | | | 5 | | | 5 |
| 200GHDD | | 5 | | | | 5 | | 5 | |

Products Distance Matrix

| | Product 1 | Product 2 | Product 3 | Product 4 | Product 5 | Product 6 | Product 7 | Product 8 |
|---|---|---|---|---|---|---|---|---|
| Product 1 | 20 | 1 | 4 | 7 | 14 | 17 | 11 | 20 |
| Product 2 | 1 | 20 | 1 | 6 | 13 | 13 | 13 | 19 |
| Product 3 | 1 | 1 | 20 | 7 | 10 | 13 | 18 | 20 |
| Product 4 | 7 | 6 | 7 | 20 | 8 | 13 | 10 | 18 |
| Product 5 | 14 | 13 | 12 | 10 | 20 | 1 | 2 | 20 |
| Product 6 | 15 | 14 | 13 | 9 | 1 | 20 | 1 | 19 |
| Product 7 | 16 | 15 | 14 | 11 | 2 | 1 | 20 | 18 |
| Product 8 | 20 | 19 | 20 | 18 | 20 | 20 | 20 | 20 |

Fig. 7

Substitution Probability Matrix (810)

| | Product 1 | Product 2 | Product 3 | Product 4 | Product 5 | Product 6 | Product 7 | Product 8 |
|---|---|---|---|---|---|---|---|---|
| Product 1 | | 0 | 0.444444 | 0 | 0 | 0 | 0.25 | 0 |
| Product 2 | 0.333333 | 0 | 0.333333 | 0 | 0 | 0 | 0.122807 | 0.017544 |
| Product 3 | 0.59375 | 0 | 0 | 0 | 0 | 0 | 0.0625 | 0 |
| Product 4 | 0.265306 | 0 | 0.265306 | 0 | 0 | 0 | 0.204082 | 0.040816 |
| Product 5 | 0.139535 | 0 | 0.186047 | 0 | 0 | 0 | 0.418605 | 0 |
| Product 6 | 0.116279 | 0 | 0.162791 | 0 | 0 | 0 | 0.11486 | 0.023256 |
| Product 7 | 0.173913 | 0 | 0.26087 | 0 | 0 | 0 | 0 | 0.086957 |
| Product 8 | 0 | 0 | 0 | 0 | 0 | 0 | 0 | 0 |

Fig. 8

Substitution Contribution Matrix

| | Product 1 | Product 2 | Product 3 | Product 4 | Product 5 | Product 6 | Product 7 | Product 8 |
|---|---|---|---|---|---|---|---|---|
| Product 1 | 0 | 0 | 2.222222 | 0 | 0 | 0 | 1.25 | 0 |
| Product 2 | 1.666667 | 0 | 1.666667 | 0 | 0 | 0 | 0.614035 | 0.087719 |
| Product 3 | 2.96875 | 0 | 0 | 0 | 0 | 0 | 0.3125 | 0 |
| Product 4 | 1.326531 | 0 | 1.326531 | 0 | 0 | 0 | 1.020408 | 0.204082 |
| Product 5 | 0.697674 | 0 | 0.930233 | 0 | 0 | 0 | 2.093023 | 0 |
| Product 6 | 0.581395 | 0 | 0.813953 | 0 | 0 | 0 | 2.209302 | 0.116279 |
| Product 7 | 0.869565 | 0 | 1.304348 | 0 | 0 | 0 | 0 | 0.434783 |
| Product 8 | 0 | 0 | 0 | 0 | 0 | 0 | 0 | 0 |

Effective Substitution Contribution Matrix ↙1010

| | Product 1 | Product 2 | Product 3 | Product 4 | Product 5 | Product 6 | Product 7 | Product 8 |
|---|---|---|---|---|---|---|---|---|
| Product 1 | 0 | 0 | 0 | 0 | 0 | 0 | 0 | 0 |
| Product 2 | 1.666667 | 0 | 1.666667 | 0 | 0 | 0 | 0.614035 | 0.087719 |
| Product 3 | 0 | 0 | 0 | 0 | 0 | 0 | 0 | 0 |
| Product 4 | 1.326531 | 0 | 1.326531 | 0 | 0 | 0 | 1.020408 | 0.204082 |
| Product 5 | 0.697674 | 0 | 0.930233 | 0 | 0 | 0 | 2.093023 | 0 |
| Product 6 | 0.581395 | 0 | 0.813953 | 0 | 0 | 0 | 2.209302 | 0.116279 |
| Product 7 | 0 | 0 | 0 | 0 | 0 | 0 | 0 | 0 |
| Product 8 | 0 | 0 | 0 | 0 | 0 | 0 | 0 | 0 |

Fig. 10

ASSORTMENT PLANNING BASED ON DEMAND TRANSFER BETWEEN PRODUCTS

TECHNICAL FIELD

The subject matter described herein relates to information management systems. In particular, the subject matter described herein related to systems and methods for assortment planning.

BACKGROUND

For a commercial retailer, the set of products carried in each store at a point in time can be referred to as the retailer's assortment. Assortment planning relates to specifying an assortment that maximizes a goal or goals such as sales revenue or gross margin, limited to certain restrains such as limited budget for purchasing products, limited shelf space for displaying products, and avoidance of single supplier situations.

The assortment of a retailer has a significant impact on sales and gross margin, and therefore assortment planning is seen as of high importance to many retailers. Some attempts have been made to provide commercial tools relating to assortment planning. For examples, see the Automated Micro Assortment Planner from Galleria Retail Technology Solution Ltd.; Torex Compass-SCM from Torex Retail Holding Ltd.; 7thOnline; SAP Retail Merchandise and Assortment Planning from SAP; and Oracle Retail Category Management from Oracle. However, none of these commercial techniques deals effectively with the effect of transfer of demand from one product to another product in the situation where the first product is not available to the customer.

Academic literature has proposed certain approaches for enhancing assortment planning including some research relating to an effective demand for a product including both the original demand for the product and substitution demand from other products. For example, see, "Assortment Planning: Review of Literature and Industry Practice," A. G. Kok, M. L. Fisher, R Vaidyanathan (2006); and "Demand Estimation and Assortment Optimization Under Substitution: Methodology and Application," A. G. Kok, M. L. Fisher, Operations Research, Vol. 55, No. 6, November-December 2007, pp. 1001-1021. However, the proposals described in the academic literature for research purposes make certain assumptions which limit their effective use in a commercial setting for assortment planning. For example, many of the approaches do not use commercial transaction data. Although the approach described in Kok and Fisher 2007 makes use of transaction data, the approach requires either data from multiple stores having different assortments, which may introduce errors due to customer demographics and be contrary to central assortment planning, or using data from different experimental assortments at a single store, potentially costing the store profit opportunities.

SUMMARY

A computer-implemented method is described for facilitating selection of an assortment of products to offer for sale. The method includes receiving transaction data representing characteristics of a plurality of commercial transactions, and receiving product attribute data representing attributes for at least a first product and a second product. Substitution demand data for the second product is estimated which represents demand for the second product given the first product is not available, the estimation being based at least in part on the transaction data and the product attribute data.

A system is described for facilitating selection of an assortment of products to offer for sale. The system includes an input/output system adapted to receive transaction data representing characteristics of a plurality of commercial transactions, and attribute data representing attributes for at least a first product and a second product. A processing system is arranged and programmed to estimate substitution demand data for the second product representing demand for a second product given the first product is not available, the estimation being based at least in part on the transaction data and the product attribute data.

As used herein the terms "product" and "products" refers to any combination or part of any tangible or intangible product, any tangible or intangible services, as well as any tangible or intangible promotion. The techniques describe herein are applicable to both subcategory assortment planning as well as category assortment planning.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages including facilitating the assortment planning process in a commercial setting based on product demand including transferred demand between products estimated from transaction data and the product's attributes.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 shows a user interface to aid users in assortment planning;

FIG. 4 shows a user interface to aid users in viewing and entering parameters relating to assortment planning;

FIGS. 5a-5c show an example of a co-occurrence matrix relating to a laptop computer purchases;

FIG. 7 shows an example of a products distance matrix;

FIG. 8 shows an example of a substitution probability matrix;

FIG. 9 shows an example of a substitution contribution matrix;

FIG. 10 shows an example of an effective substitution contribution matrix;

DETAILED DESCRIPTION

Figure 1:
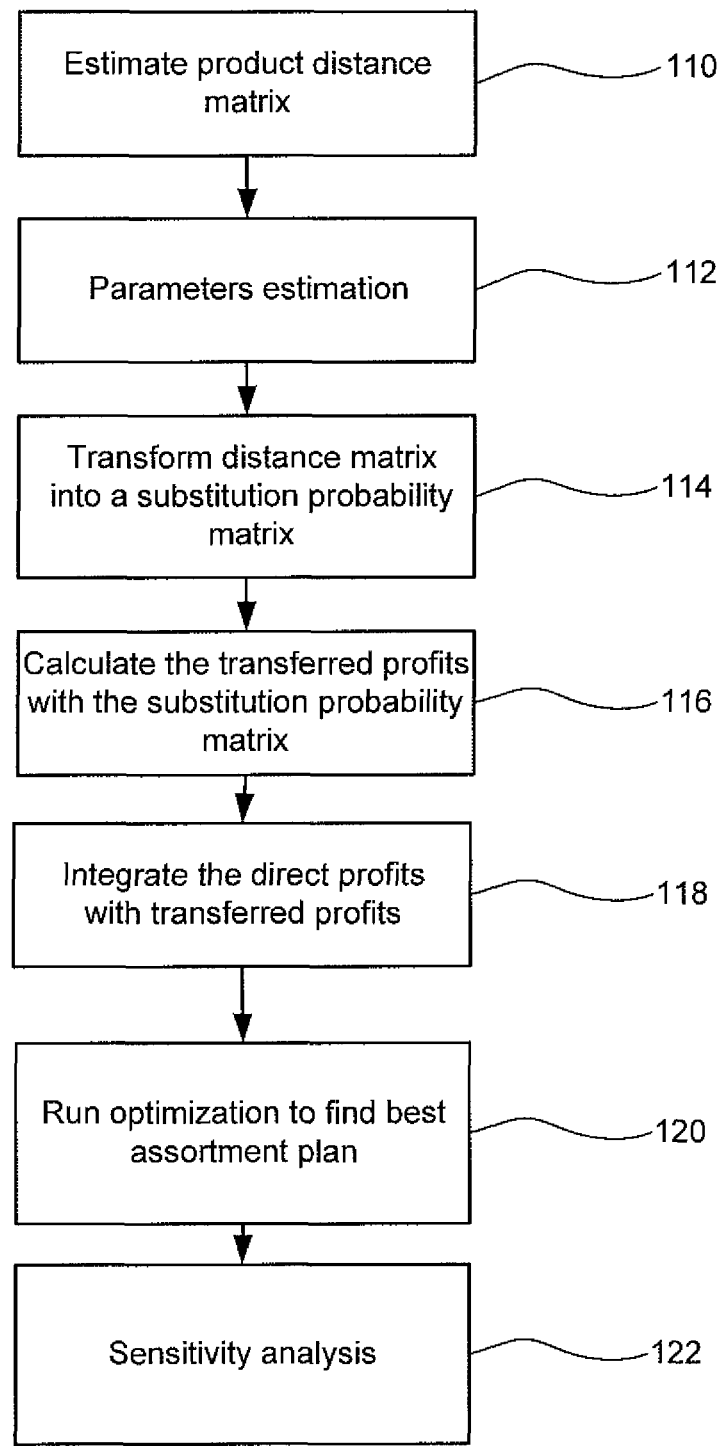
FIG. 1 flowchart showing steps involved in a methodology for product assortment planning.
Figure 2:
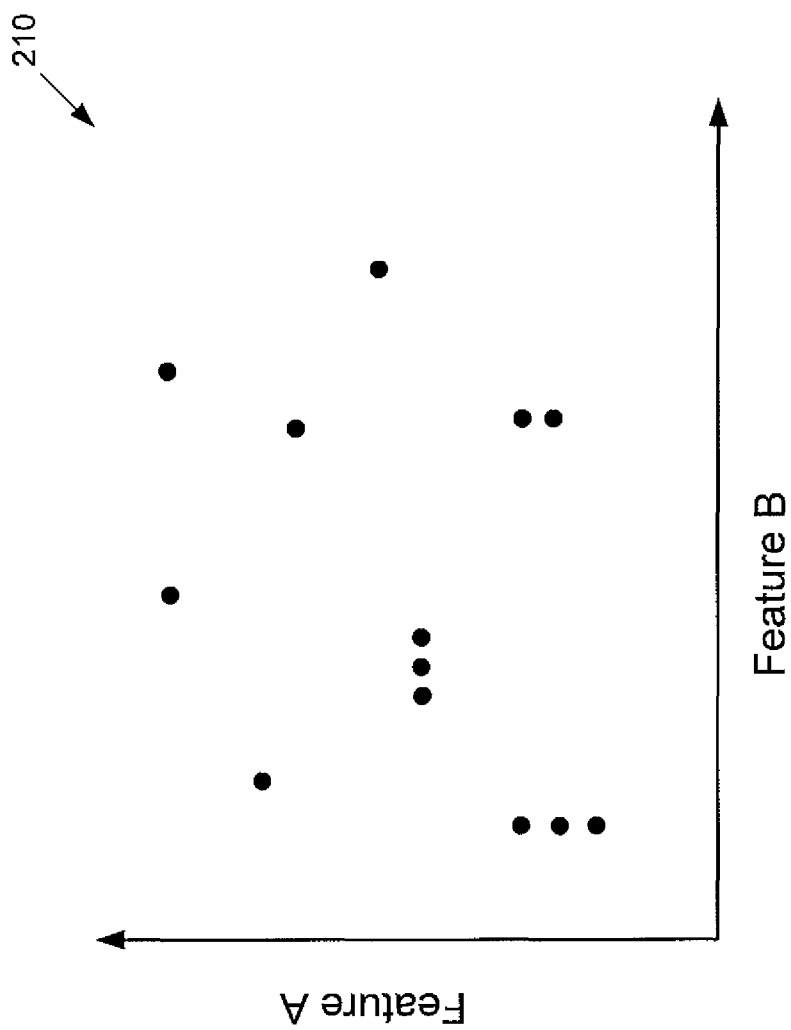
FIG. 2 is an example of products plotted in an attribute space.

FIG. 1 flowchart showing steps involved in a methodology for product assortment planning. In step 110, a product distance matrix is estimated. The product distance matrix gives a measure of the closeness between two products in terms of substitutability. Further details in techniques for calculating a product distance matrix are provided below, including techniques described in U.S. Patent Application Publ. Nos. 2007/0118439, 2007/0100680, 2007/0094067, and 2007/0094066, each of which is incorporated herein by reference. In this example, the product distance matrix calculation is done in the attribute space. Such a calculation is based on two types of data: (1) the point of sale transaction data; and (2) feature values, or attributes, associated with each product in the assortment. FIG. 2 is an example of products plotted in an attribute space 210. A basic assumption is made that each product can be completely and uniquely described by its attributes. Thus, each product is a point in the attribute space. In the example shown in FIG. 2, only two attributes are shown, namely "Feature A" and "Feature B." Each product is represented in FIG. 2 as a point in the attribute space. Note that in this simple example, there are many combinations of Feature A and Feature B that have no products. Referring again to FIG. 1, from the transaction data we can compute a point-wise co-occurrence of the different attributes. For example, for the two screen doors shown in Table 1, we can compute the co-occurrence counts of every pair of attributes (SunTech-Columbia, SunTech-Wood, SunTech-Metal, Columbia-Wood, Columbia-Metal).

TABLE 1

| Brand | Material |
|---|---|
| SunTech | Wood |
| Columbia | Metal |

Random, or inconsistent, pairs in the co-occurrence matrix are pruned using information theoretic measures to yield affinity scores between the attribute pairs or the Attribute Affinity matrix. As will be described in further detail below, according to some examples a point-wise mutual information (PMUI) measure is used to reduce random or inconsistence data, or noise, from the co-occurrence matrix.

The following nomenclature is used herein:
E={Set of all entity types}
X=Entity Type
X, $X_i$=Entity instance of type X
$\alpha_X$=Attribute vestor associated with entity X
x,$x_i$=Individual attributes of entity X $U_X$ = Universal attribute vector for entity type $X$ which is equal to $= \bigcup_X \alpha_X$ $\beta_X$=Binary weight vector for entity X
$\beta_X(i)=1 \Leftrightarrow$ Attribute $U_x(i)$ is applicable to entity X= $0 \Leftrightarrow$ Attribute $U_x(i)$ is not applicable to entity X. Although in many examples described herein the entity type is a product, in general the entity types can be product, customer, store, etc. In the case where the entity type is product, examples of different instances can be laptop, CPU, monitor, toothpaste, cereal bar, etc. Examples of attributes associated with instance Laptop include: Brand, CPU speed, RAM, monitor size, graphics card, cost, etc. Examples of attributes associated with instance cereal bar can be: Brand, nutrition value, cost, etc.

The cohesiveness of a product is computed as a function of the affinities of all attribute pairs of that product. The distance between two products is computed as:

$$D(U_1, U_2) = \sqrt{\sum_i (\pi(U_1) - \pi(U_{12}^i))^2}$$

Where:
$U_1, U_2$=Two products between which the distance is to be measured $U_{12}^i$=$U_1$ with its $i^{th}$ element substituted by the $i^{th}$ element of $U_2$; and the function $\pi(x)$=cohesiveness of set x.

The distance measure is calculated with respect to $U_1$ and so is asymmetric. The distance can be computed not only between two products but also between any point in the attribute space (i.e a unique set of attributes that may or may not define an existing product) and another point in the attribute space. Therefore, the Attribute Affinity matrix can be mined to discover unique points (product(s) as defined by those attributes) that are most consistently purchased by customers. These customer points can be used in assortment planning. For demand transfer the matrix of distance values between every pair of products is used.

In step 112, parameters such as the following are estimated: (1) inventory costs; (2) product prices and costs; (3) original demand of each product (i.e., market share); and (3) expected number of customers in the planning period.

In step 114, the distance matrix is transformed into a substitution probability matrix. Although the present transformation has a different method and for a different purpose, the transformation can be based on techniques described in van Ryzin, G., S. Mahajan, "On the relationship between inventory costs and variety benefits in retail assortments," Management Science, 45, p. 1496-1509, (1999), which is incorporated herein by reference. The transform is based on the principle that the larger the distance is, the lower the substitution probability is and vise versa. In some examples, the substitution probability is assigned to the products (including the option to leave without substitution) in the assortment list reverse-proportionally to the distance. The distance associated with the situation where a customer leaves without making a substitute purchase (denoted by symbol Delta) can be set by the user and can be studied under a sensitivity analysis, as described further below.

In step 116, the transferred profits with the substitution probability matrix is calculated. Although the probability matrix is obtained in a different way, techniques can be used as described in Smith, S. A., N. Agrawal, "Management of multi-item retail inventory systems with demand substitution," Operations Research, 48 p. 50-64 (2000), which is incorporated herein by reference. The expected transferred profit of each product in the assortment list will be calculated given the substitution probability.

In step 118, the direct profits are added to the transferred profits to yield integrated profits.

In step 120, an optimization is run to find the best assortment plan. The optimization process is to maximize the expected profit subject to certain constraints. Examples of constraints are: (1) total number of products in the list should be less than a certain amount; (2) product A must be included in the assortment list; and (3) products A and B can not be both included in the list and etc. The optimization problem is a constrained integer programming problem which can be solved using an exhaustive search of all the possible combinations, or by another known algorithm for constrained integer programming.

In step 122, a sensitivity analysis is preformed. The sensitivity analysis studies the impact of parameter Delta (i.e., the distance to the option of leaving without substitution) on the assortment solutions. Delta is defined as a "distance" to leaving without purchase if the targeted product is not available. In the sensitivity analysis, for a given assortment plan, the expected profit of this plan is calculated for all possible values of Delta. Then any two assortment plans can be compared along the Delta axis.

FIG. 3 shows a user interface to aid users in assortment planning. In product selection area 312 of interface screen 310, users can select or deselect any product from the products list. The corresponding net profit is displayed to the user in area 322, which combines direct profits shown in are 314 and transferred profits shown in are 316. Integrated profits and inventory costs for each product can also be shown in areas 318 and 320 respectively. In this example, users can obtain the optimal assortment by clicking "Optimize it!" button 324, which relies on the assortment planning techniques described herein.

FIG. 4 shows a user interface to aid users in viewing and entering parameters relating to assortment planning. Parameters setting UI. The Parameters in areas 426, 412, 416, 418, and 420 in many applications are straight forward to estimate. However, it is generally more difficult to estimate the parameters relating a customer's likelihood to leave without a purchase (i.e. the parameter Delta mentioned above) if the product is not available, in area 422. Therefore, sliders in area 424 are provided to make adjustments to the parameters in area 422. Furthermore, a sensitivity analysis function, described in further detail below, is used to study the impact of these parameters on the assortment solutions.

Figure 5C:
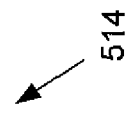

FIGS. 5a-5c show an example of a co-occurrence matrix relating to a laptop computer purchases. In FIG. 5a, as shown in table 510, the entity type is equal to laptop computers. There are three products in this example: Laptop $X_1$, Laptop $X_2$, and Laptop $X_3$. In this example there are four product attributes being tracked: brand, screen size, processor type, and hard disk size. The attributes occurring with each laptop type are shown in FIG. 5a. In FIG. 5b, from table 512, it can be seen that several attributes occur in more than one type of laptop, namely "Centrino", "250HDD", and "15" Screen." appear as attributes in two different laptops. FIG. 5c shows a co-occurrence matrix 514 for purchases of laptops having the attributes as shown in FIG. 5a. In this example, the transaction data is as follows: Laptop $X_1$-3 purchases; Laptop $X_2$-4 purchases; and Laptop $X_3$-5 purchases. Additionally, in this example each of the purchases occurred in different baskets. In these examples, the co-occurrence matrix shows in each cell a count reflecting the number of baskets in which the two attributes co-occurred. Since it was assumed that each laptop purchase was in a separate basket, the counts or co-occurrences of the combinations of features or attributes is as shown in FIG. 5c. Note that the definition of a "basket" is an important consideration and is application specific. Typically, a 'basket' is defined as a set of transactions that meet a certain criterion. For example, a basket can be defined as all the transactions from a single customer or all transactions of a single customer that occurred within n days of each other, or in a specified calendar period, etc. The appropriate definition of a basket depends on the corresponding product domain. In many applications, for estimating parameters such as demand transfer, a basket is defined a purchases from a single customer. Further, depending on the type of product, a basket can be further restricted to purchases by the customer at the same time, the same day or over some other period of time. For smaller products such as grocery items, it has been found that the basket should be defined as a customer purchase at a given instance or purchases made on the same day. For more expensive products, such as laptop computers and other electronics, a basket may be defined as purchases by a given customer over a several month period or longer. By defining a basket for such longer time frames, the co-occurrence matrix will count several purchases of the time frame by the same customer as co-occurrences.

Figure 6:
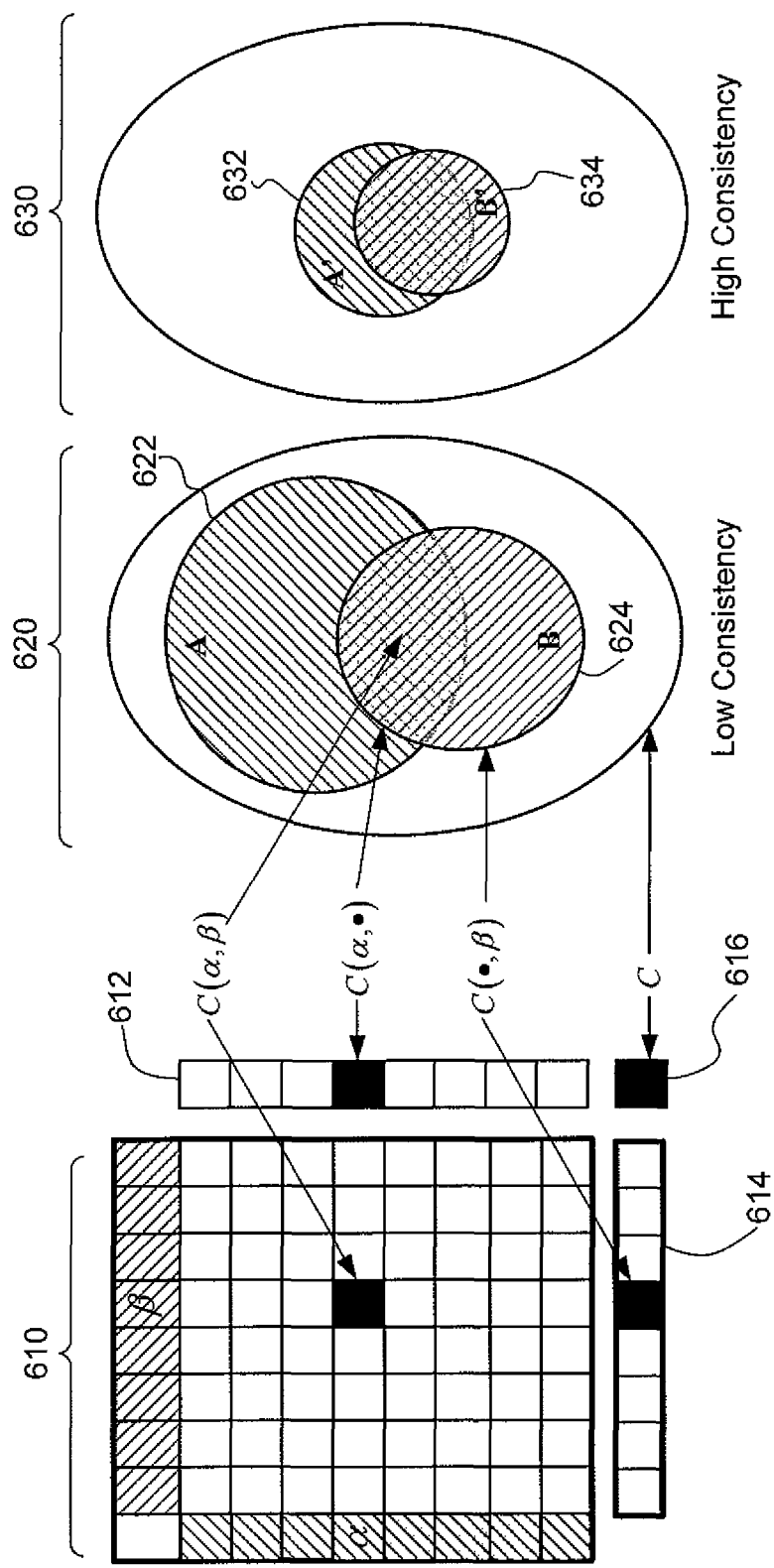
FIG. 6 shows two examples of co-occurring attributes or features.

FIG. 6 shows two examples of co-occurring attributes or features. Two features $\alpha$ and $\beta$, are shown in a co-occurrence matrix 610. The count $C(\alpha, \beta)$, reflects the number of co-occurrences (i.e. the number baskets where the two features or attributes co-occur). The total count of the attribute a co-occurring with any other attribute is shown as $C(\alpha, \bullet)$ in column 612. Likewise, the total count of the attribute $\beta$ co-occurring with any other attribute is shown as $C(\bullet, \beta)$ in row 614. The total number of all co-occurrences is shown in box 616. Venn diagram 620 shows the overlap, or co-occurrence of attribute $\alpha$ in area 622, with attribute $\beta$ in area 624. In the example shown in diagram 620 there is a relatively low consistency between the occurrences of $\alpha$ and $\beta$. On the other hand, in venn diagram 630 there is relatively high consistence between the occurrences of $\alpha$ and $\beta$ as shown by the overlap between area 632 and 634.

In many applications, techniques can be used to reduce the "noise" and quantify the consistency or cohesiveness of pairs of co-occurring attributes or features. The probabilities relating to the attributes or features $\alpha$ and $\beta$ can be expressed as follows:

$$P(\alpha) = \frac{C(\alpha)}{C}, P(\overline{\alpha}) = \frac{C - C(\alpha)}{C}$$

$$P(\beta) = \frac{C(\beta)}{C}, P(\overline{\beta}) = \frac{C - C(\beta)}{C}$$

$$P(\alpha, \beta) = \frac{C(\alpha, \beta)}{C}, P(\overline{\alpha}, \overline{\beta}) = \frac{C - [C(\alpha) + C(\beta) - C(\alpha, \beta)]}{C}$$

$$P(\alpha, \overline{\beta}) = \frac{C(\alpha) - C(\alpha, \beta)}{C}, P(\overline{\alpha}, \beta) = \frac{C(\beta) - C(\alpha, \beta)}{C}.$$

According to the invention a point-wise mutual information (PMUI) us used to quantify the discrepancy between the probability of their coincidence given their joint distribution versus the probability of their coincidence given only their individual distributions and assuming independence. The formula for PMUI can be expressed:

$$PMUI = \max\left\{0, \log\left[\frac{P(\alpha, \beta)}{P(\alpha)P(\beta)}\right]\right\}.$$

However, other techniques could also be used for reducing "noise" and quantifying the cohesiveness or measure the consistency of co-occurring pairs of attributes or features. For example, one or more of the following could be used:

Support: $P(\alpha, \beta)$;

Piatestsky-Shapiro: $P(\alpha, \beta) - P(\alpha)P(\beta)$;

Interest: $\dfrac{P(\alpha, \beta)}{P(\alpha)P(\beta)}$;

Cosine: $\dfrac{P(\alpha, \beta)}{\sqrt{P(\alpha)P(\beta)}}$;

Jaccard: $\dfrac{P(\alpha, \beta)}{P(\alpha) + P(\beta) - P(\alpha, \beta)}$;

Phi-Coefficient: $\dfrac{P(\alpha, \beta) - P(\alpha)P(\beta)}{\sqrt{P(\alpha)P(\beta)P(\overline{\alpha}))P(\overline{\beta})}}$;

Confidence: $\max\{P(\alpha \mid \beta), P(\beta \mid \alpha)\}$;

Added Value: $\max\{P(\beta \mid \alpha) - P(\beta), P(\alpha \mid \beta) - P(\alpha)\}$;

Klosgen: $\sqrt{P(\alpha, \beta)}\ \max\{P(\beta \mid \alpha) - P(\beta), P(\alpha \mid \beta) - P(\alpha)\}$;

Certanty Factor: $\max\left\{\dfrac{P(\beta \mid \alpha) - P(\beta)}{1 - P(\beta)}, \dfrac{P(\alpha \mid \beta) - P(\alpha)}{1 - P(\alpha)}\right\}$;

Laplace: $\max\left\{\dfrac{P(\alpha)P(\overline{\beta})}{P(\alpha, \overline{\beta})}, \dfrac{P(\overline{\alpha})P(\beta)}{P(\overline{\alpha}, \beta)}\right\}$;

Odds-Ratio: $o = \dfrac{P(\alpha, \beta)P(\overline{\alpha}, \overline{\beta})}{P(\alpha, \overline{\beta})P(\overline{\alpha}, \beta)}$;

Yule's $Q$: $\dfrac{o - 1}{o + 1} = \dfrac{P(\alpha, \beta)P(\overline{\alpha}, \overline{\beta}) - P(\alpha, \overline{\beta})P(\overline{\alpha}, \beta)}{P(\alpha, \beta)P(\overline{\alpha}, \overline{\beta}) + P(\alpha, \overline{\beta})P(\overline{\alpha}, \beta)}$;

Yule's $Y$: $\dfrac{\sqrt{o} - 1}{\sqrt{o} + 1} = \dfrac{\sqrt{P(\alpha, \beta)P(\overline{\alpha}, \overline{\beta})} - \sqrt{P(\alpha, \overline{\beta})P(\overline{\alpha}, \beta)}}{\sqrt{P(\alpha, \beta)P(\overline{\alpha}, \overline{\beta})} + \sqrt{P(\alpha, \overline{\beta})P(\overline{\alpha}, \beta)}}$;

Kappa: $\dfrac{P(\alpha, \beta) + P(\overline{\alpha}, \overline{\beta}) - P(\alpha)P(\overline{\beta}) - P(\overline{\alpha})P(\beta)}{1 - P(\alpha)P(\beta) - P(\overline{\alpha})P(\overline{\beta})}$;

Collective Strength: $\left[\dfrac{P(\alpha, \beta) + P(\overline{\alpha}, \overline{\beta})}{P(\alpha)P(\beta) + P(\overline{\alpha})P(\overline{\beta})}\right] \times \left[\dfrac{1 - P(\alpha)P(\beta) - P(\overline{\alpha})P(\overline{\beta})}{1 - P(\alpha, \beta) - P(\overline{\alpha}, \overline{\beta})}\right]$;

Mutual-Information: $\dfrac{I(\alpha, \beta)}{\min\{H(\alpha), H(\beta)\}}$, $I(\alpha, \beta) = \sum\limits_{a \in \{\alpha, \overline{\alpha}\}} \sum\limits_{b \in \{\beta, \overline{\beta}\}} P(a, b)\log\dfrac{P(a, b)}{P(a)P(b)}$, $H(\alpha) = -\sum\limits_{a \in \{\alpha, \overline{\alpha}\}} P(a)\log P(a)$;

J-Measure: $\max\left\{\begin{array}{l} P(\alpha, \beta)\log\dfrac{P(\alpha \mid \beta)}{P(\alpha)} + P(\overline{\alpha}, \beta)\log\dfrac{P(\overline{\alpha} \mid \beta)}{P(\overline{\alpha})}, \\ P(\alpha, \beta)\log\dfrac{P(\beta \mid \alpha)}{P(\beta)} + P(\alpha, \overline{\beta})\log\dfrac{P(\overline{\beta} \mid \alpha)}{P(\overline{\beta})} \end{array}\right\}$;

Gini Index: $\max\left\{\begin{array}{l} P(\alpha)\left[P(\beta \mid \alpha)^2 + P(\overline{\beta} \mid \alpha)^2\right] + P(\overline{\alpha})\left[P(\beta \mid \overline{\alpha})^2 + P(\overline{\beta} \mid \overline{\alpha})^2\right] - P(\beta)^2 - P(\overline{\beta})^2 \\ P(\beta)[P(\alpha \mid \beta)^2 + P(\overline{\alpha} \mid \beta)^2] + P(\overline{\beta})\left[P(\alpha \mid \overline{\beta})^2 + P(\overline{\alpha} \mid \overline{\beta})^2\right] - P(\alpha)^2 - P(\overline{\alpha})^2 \end{array}\right\}$; and Goodman-Kruskal: $\dfrac{\sum\limits_{a \in \{\alpha, \overline{\alpha}\}} \max\limits_{b \in \{\beta, \overline{\beta}\}} P(a, b) + \sum\limits_{b \in \{\beta, \overline{\beta}\}} \max\limits_{a \in \{\alpha, \overline{\alpha}\}} P(a, b) - \max\limits_{a \in \{\alpha, \overline{\alpha}\}} P(a) - \max\limits_{b \in \{\beta, \overline{\beta}\}} P(b)}{2 - \max\limits_{a \in \{\alpha, \overline{\alpha}\}} P(a) - \max\limits_{b \in \{\beta, \overline{\beta}\}} P(b)}$.

If the PMUI or one or more of the other techniques is used then the co-occurrence matrix for will be modified such that the entries for each cell will reflect a modified number (i.e. a real number) rather than a simple integer count of the co-occurrences. In some applications, where one or more of the attributes are believed to be more important than others, the attributes can be weighted according to one or more known weighting functions.

FIG. 7 shows an example of a products distance matrix. The products distance matrix 710 is estimated by from the co-occurrence matrix directly, or from a modified co-occurrence matrix as describe above. The products listed in column 712 represent the customer's original target product, while the products listed in row 720 represent the potential substituted products. For example, the number "6" in the dotted-line circle represents the distance associated with the situation where the customer originally wanted to purchase Product 4, but instead will purchase Product 2 instead. In this example, the distances range from 0 to 20, although other ranges could be used as it is the relative distances that is important. Note that, the diagonal items are set to be 20, since any product can not substitute itself.

In these examples, the distance between two products can be estimated using:

$$D(U_1, U_2) = \sqrt{\sum_i (\pi(U_1) - \pi(U_{12}^i))^2},$$

where, $U_{12}^i = U_1$ with its $i^{th}$ element substituted with the $i^{th}$ element of $U_2$; and $\pi(x)$=bundleness or cohesiveness of set x.

Note that the distance measure is calculated with respect to $U_1$ and is therefore not symmetric (i.e. $D(U_1, U_2) \neq D(U_2, U_1)$). Likewise, the product distance matrix is not symmetric.

According on one example, the cohesiveness function $\pi(x)$ can be calculated by taking the smallest value in the unnormalized eigen vector of a co-occurrence submatrix corresponding to the bundle. The co-occurrence submatrix is the counts matrix after it has been passed through the PMUI function, or another of the functions as described above.

FIG. 8 shows an example of a substitution probability matrix 810. The products distance matrix 710 from FIG. 7 is transformed to substation probability matrix 810, which can measure the likelihood of demand transfer between any pair of products. The interpretation of these probabilities can be shown by the following example. Probability, 0.33 in the dotted-line circle means if Product 2 is not included in the assortment, then the customer who originally intend to purchase Product 2 will choose Product 1 instead with probability 0.33. Note that the columns of products 2, 4, 5, and 6 are set zeros since these products are not selected in the user interface shown in FIG. 3.

FIG. 9 shows an example of a substitution contribution matrix. Substitution contribution matrix 910 is used calculate the expected profits earned by substitution based on the probability matrix 810 of FIG. 8. The values for each cell of the contribution matrix 910 are calculated by multiplying the initial demand for the customer's target product, the expected value of the substitution (from the substitution probability matrix), and the estimated profit of the substituted product.

FIG. 10 shows an example of an effective substitution contribution matrix. The effective substitution contribution matrix 1010 is similar to the substitution contribution matrix 910 of FIG. 9 but with the rows of products 1, 3, 7 and 8 are set to zero, since these products have been selected in by the user using the user interface as in the example shown in FIG. 3. Therefore, no substitution could happen with respect to the non-selected products.

Figure 11:
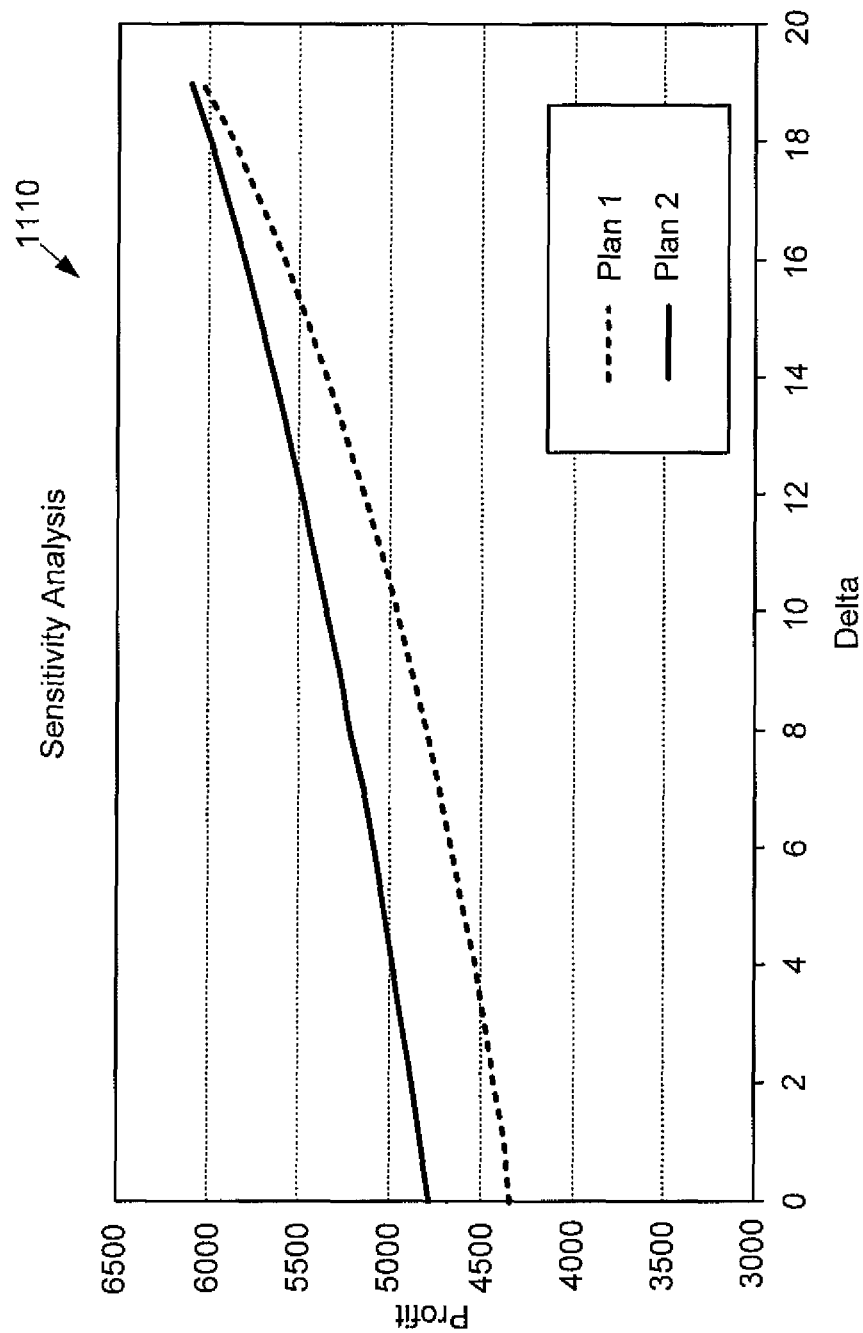
FIGS. 11 and 12 show plots of a sensitivity analysis.
Figure 12:
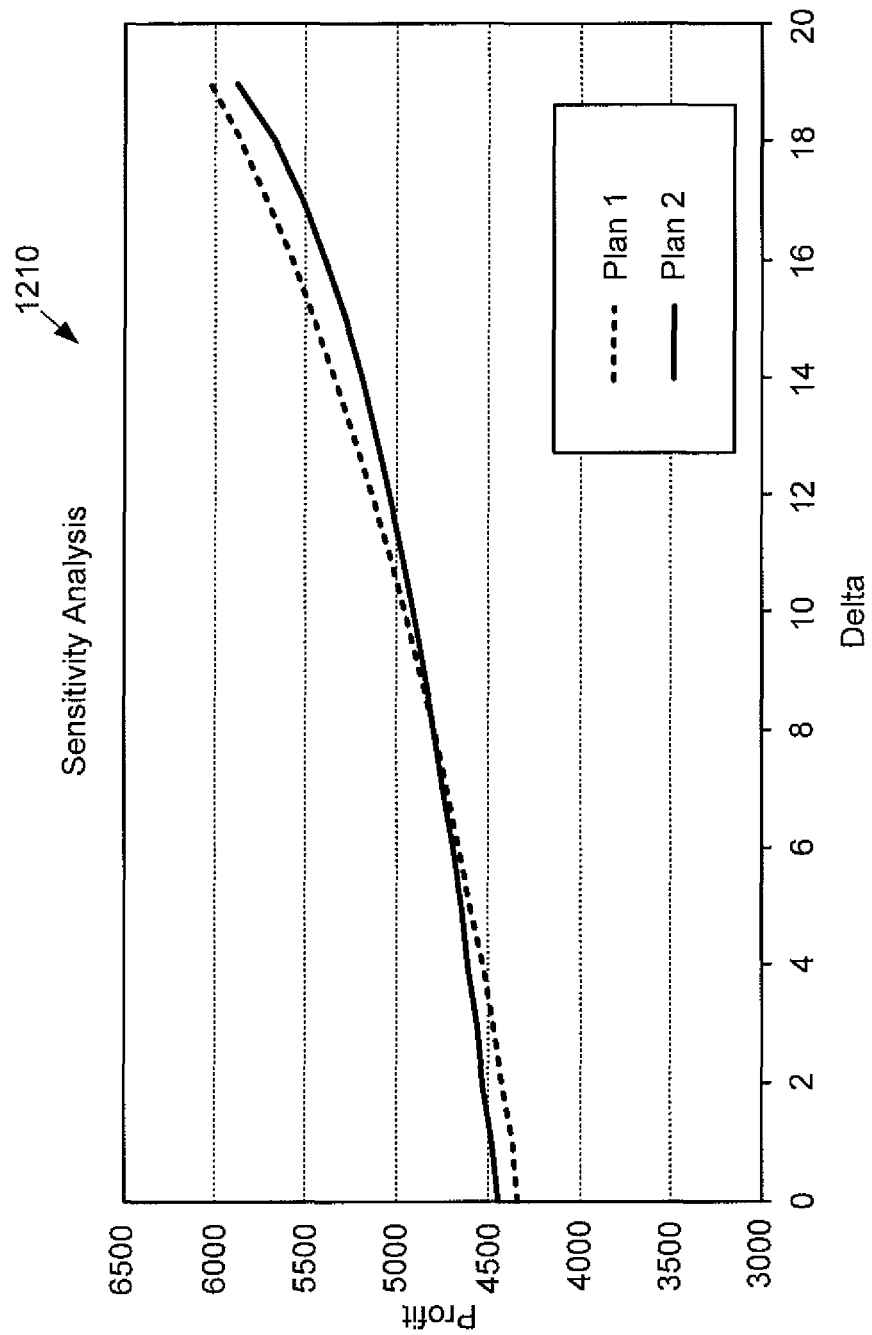

FIGS. 11 and 12 show plots of a sensitivity analysis. A sensitivity analysis is used to study the impact of parameters on the assortment solutions. In this example, the parameter being studied is a distance measure which quantifies a distance (as in a product distance matrix) to a point where the customer will leave without purchase if the customer's targeted product is not available. As we have discussed above, with respect to FIG. 4 above, in many applications it may be difficult to estimate such a distance parameter. Thus a sensitivity analysis on the distance parameter can be conducted using the input of the sliders in area 424 to modify the distance parameters shown in area 422. Referring again to FIG. 11, Sensitivity plot 1110 shows the profit associated with two different assortment plans, namely Plan 1 and Plan 2, is plotted for different values of the parameter being studied. In this case, the parameter "Delta" is the distance to a situation where the customer will leave with out making a purchase if the targeted product is not available. As can be seen, the profit from Plan 2 dominates that of Plan 1 throughout the various values of Delta. In other words, Plan 2 is always better than Plan 1 no matter what value Delta is and thus we can conclude that that plan is the better plan without estimating Delta. On the other hand, in FIG. 12, it can be seen from sensitivity plot 1210 that Plan 2 is more preferable, if the customers tend to leave without purchasing anything when his targeted product is not available (i.e. lower values for Delta). For higher values of Delta, which reflects the situation where customers are likely to find a substitute instead of leaving without purchase, Plan 1 is more profitable. In the case shown in FIG. 12, although the estimation of Delta is useful, only a rough estimation is required to decide a better plan.

It has been found by conducting sensitivity analysis such as described, that in many cases the parameter "Delta" which quantifies the customer's pickiness, or likelihood to leave with out making a purchase when his/her targeted product is not available, is not critical to assortment planning.

Figure 13:
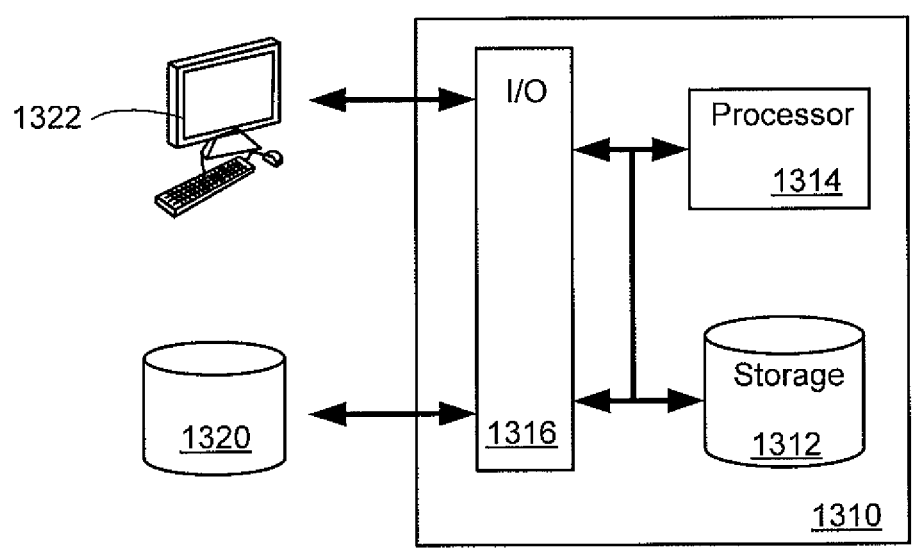
FIG. 13 shows a computer-implemented system for facilitating assortment planning.

FIG. 13 shows a computer-implemented system for facilitating assortment planning. A user interface, as shown and described with respect to FIGS. 3-4 is implemented on computer terminal 1322. Terminal 1322 preferably includes a display for displaying graphical information and a keyboard and pointing device to receive input from users. Input/output system 1316 sends and receives information from the processing system 1310 to terminal 1322 and external database 1320. External database 1320 can be used to store commercial transaction data that can be used by the system for estimating demand values for products including transferred demand as described herein. Database 1320 can also be used to store relevant attributes or features for products involved in the assortment planning. Note that transaction data and/or product attributes can also be entered by a user via terminal 1322. The information received from terminal 1322 and external database 1320 via input/output system 1316 can be stored in storage system 1312 for use by processor 1314 for performing the assortment planning operations as described herein.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. Other embodiments may be within the scope of the following claims.

What is claimed is:

1. A computer-implemented method for facilitating selection of an assortment of products to offer for sale, the method being implemented by one or more data processors and comprising:

receiving, by at least one data processor, transaction data representing characteristics of a plurality of commercial transactions;

receiving, by at least one data processor, product attribute data representing attributes for at least a first product of a plurality of products and representing attributes for a second product of the plurality of products;

determining, by at least one data processor, distance between each pair of products of the plurality of products to form a distance matrix characterizing a plurality of distances, the distance characterizing a measure of closeness between each respective pair of products in terms of substitutability;

transforming, by at least one data processor, the distance matrix to a probability matrix, one or more elements in the probability matrix characterizing a probability of purchase of a corresponding second product when a corresponding first product is desired but unavailable, other elements in the probability matrix being zero, the zero elements characterizing that at least one product of a corresponding pair of products is not selected;

determining, by at least one data processor and based on the probability matrix, transferred profits associated with transfer of demand from one product to another product;

determining, by at least one data processor, integrated profits by adding the transferred profits and direct profits; and optimizing, by at least one data processor, the integrated profits to maximize a total net profit obtained using the integrated profits, the optimizing providing an assortment of products.

2. A method according to claim 1 further comprising recommending, by at least one data processor, the assortment of products.

3. A method according to claim 1 wherein the plurality of commercial transactions involves at least the first product and the second product.

4. A method according to claim 1, wherein the probability is based at least in part on a measure of cohesiveness of the attributes of the first product and the second product, the cohesiveness being calculated by taking a smallest value in an unnormalized eigen vector of a co-occurrence subsubmatrix.

5. A method according to claim 1, wherein the probability is based at least in part on counts of co-occurrences of the attributes of the first and second products in a transaction or set of transactions.

6. A method according to claim 5 wherein one or more attributes are weighted according to perceived importance of each attribute.

7. A method according to claim 1, wherein the probability is based at least in part on the distance from the first product to the second product, the probability representing the substitutability of the second product for the first product, the distance being defined as:

$$D(U_1, U_2) = \sqrt{\sum_i (\pi(U_1) - \pi(U_{12}^i))^2}$$

wherein:

$U_1$ and $U_2$ are two products between which distance is measured;

$U_{12}^i$ is $U_1$ with $i^{th}$ element substituted by $i^{th}$ element of $U_2$ and $\pi(x)$ is a cohesive function for set x.

8. A method according to claim 1, wherein demand data is estimated for each product being considered in the assortment, and wherein the demand data includes substitution demand data with respect a plurality of other products not being available.

9. A method according to claim 1, wherein the probability is modified based at least in part on consistency between attributes co-occurring in transactions or sets of transactions.

10. A method according to claim 9, wherein the consistency is measured at least in part using a point-wise mutual information (PMUI) measure that is characterized by:

$$PMUI = \max\left\{0, \log\left[\frac{P(\alpha, \beta)}{P(\alpha)P(\beta)}\right]\right\}$$

wherein P(x) is probability of x.

11. A method according to claim 1 further comprising:
displaying, by at least one data processor, a graphical user interface that is used for the selecting of one or more products and the unselecting of other one or more products by a user, the optimizing to provide the assortment being performed for the selected products.

12. A method according to claim 11, wherein the graphic user interface receives input parameters from the user relating to initial demand, the graphical user interface comprising sliders that are moved to change one or more distances of the plurality of distances, the changed distance causing a re-optimizing based on the changed distance, the movement of the sliders being based on a sensitivity analysis displayed to a user on the graphical user interface.

13. A method according to claim 1 wherein the first product and second products are retail products.

14. A method according to claim 1 wherein the first product includes part or all of the second product.

15. A system for facilitating selection of an assortment of products to offer for sale, the system including at least one data processor and memory and comprising:
an input/output system adapted to receive transaction data representing characteristics of a plurality of commercial transactions, and attribute data representing attributes for at least a first product and a second product;
a processing system arranged and programmed to estimate substitution demand data for the second product representing demand for the second product given the first product is not available, the estimation being based at least in part on said transaction data and said product attribute data, the estimation of demand data for the second product including estimating a probability that a customer wishing to purchase the first product will purchase the second product given the first product is not available, the probability being based at least in part on a calculated distance measure from the first product to the second product, the distance measure being changed using a slider in a graphical user interface to re-optimize assortment of products to offer for sale, the re-optimizing based on the changed distance measure;
wherein each calculated distance measure is calculated according to $$D(U_1, U_2) = \sqrt{\sum_i (\pi(U_1) - \pi(U_{12}^i))^2}$$

wherein:
$U_1$ and $U_2$ are two products between which distance is measured,
$U_{12}^i$ is $U_1$ with $i^{th}$ element substituted by $i^{th}$ element of $U_2$, and
$\pi(x)$ is a cohesive function for set x.

16. A system according to claim 15 wherein the processing system is further arranged and programmed to recommend an assortment of products to offer for sale, the selected assortment based at least in part on the estimated substitution demand for the second product.

17. A system according to claim 15 wherein the plurality of commercial transactions involves at least the first product and the second product.

18. A system according to claim 15, wherein the probability is based at least in part on a measure of the cohesiveness of the attributes of the first product and the second product.

19. A system according to claim 15, wherein the probability is based at least in part on co-occurrences of the attributes of the first and second products in a transaction or set of transactions.

20. A system according to claim 15, wherein the distance measure from the first product to the second product characterizes the substitutability of the second product for the first product.

21. A system according to claim 15, wherein demand data is estimated for each product being considered in the assortment, and wherein the demand data includes substitution demand data with respect a plurality of other products not being available.

22. A system according to claim 15, wherein the probability is modified based at least in part on consistency between attributes co-occurring in transactions or sets of transactions.

23. A system according to claim 16 wherein the recommended assortment of products is based at least in part on profit estimations for the recommended assortment.

24. A system according to claim 15 further comprising a user interface adapted and configured to displaying information to a user to aid the user in selecting an assortment of products to offer for sale, the information being based at least in part on the estimated substitution demand data for the second product.

25. An article comprising a non-transitory machine-readable medium embodying instructions that when performed by one or more machines result in operations for facilitating selection of an assortment of products to offer for sale comprising:
receiving transaction data representing characteristics of a plurality of commercial transactions involving at least the first product and the second product, the transaction data being based on an estimated product distance matrix, the product distance matrix providing a measure of a closeness between the first product and the second product in terms of substitutability, the product distance matrix calculation being based on point of sale transaction data and feature values or attributes associated with each product, the product distance matrix comprising distances between pairs of products, each distance being calculated according to $$D(U_1, U_2) = \sqrt{\sum_i (\pi(U_1) - \pi(U_{12}^i))^2}$$

wherein:
$U_1$ and $U_2$ are two products between which distance is measured,
$U_{12}^i$ is $U_1$ with $i^{th}$ element substituted by $i^{th}$ element of $U_2$, and
$\pi(x)$ is a cohesive function for set x;
receiving product attribute data representing attributes for at least a first product and a second product; and estimating substitution demand data for the second product representing demand for the second product given the first product is not available, the estimation being based at least in part on said transaction data and said product attribute data.

26. An article according to claim 25 wherein the machine-readable storage medium further embodies instructions that when performed by one or more machines result in operations comprising:

recommending an assortment of products based at least in part on the estimated substitution demand data for the second product.

27. An article according to claim 25 wherein the estimation of demand data for the second product includes estimating a probability that a customer wishing to purchase the first product will purchase the second product given the first product is not available.

28. An article according to claim 27 wherein the probability is based at least in part on a measure of the cohesiveness of the attributes of the first product and the second product.

29. An article according to claim 27 wherein the probability is based at least in part on co-occurrences of the attributes of the first and second products in a transaction or set of transactions.

30. An article according to claim 27 wherein the probability is based at least in part on a calculated distance measure from the first product to the second product, representing the substitutability of the second product for the first product.

31. An article according to claim 27 wherein demand data is estimated for each product being considered in the assortment, and wherein the demand data includes substitution demand data with respect a plurality of other products not being available.

32. An article according to claim 27 wherein the probability is modified based at least in part on consistency between attributes co-occurring in transactions or sets of transactions.

33. An article according to claim 26 wherein the recommended assortment of products is based at least in part on profit estimations for the recommended assortment.

34. An article according to claim 25 wherein the machine-readable storage medium further embodies instructions that when performed by one or more machines result in operations comprising:

displaying information to a user to aid the user in selecting an assortment of products to offer for sale, the information being based at least in part on the estimated substitution demand data for the second product.

\* \* \* \* \*